(12) United States Patent
Park et al.

(10) Patent No.: US 9,696,812 B2
(45) Date of Patent: Jul. 4, 2017

(54) APPARATUS AND METHOD FOR PROCESSING USER INPUT USING MOTION OF OBJECT

(71) Applicant: SAMSUNG ELECTRONICS CO., LTD., Suwon-si (KR)

(72) Inventors: Keun Joo Park, Seoul (KR); Jun Haeng Lee, Hwaseong-si (KR); Hyun Surk Ryu, Hwaseong-si (KR); Jun Seok Kim, Hwaseong-si (KR); Chang-Woo Shin, Hwaseong-si (KR); Jooyeon Woo, Seoul (KR); Kyoobin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 14/285,156

(22) Filed: May 22, 2014

(65) Prior Publication Data

US 2014/0354537 A1 Dec. 4, 2014

(30) Foreign Application Priority Data

May 29, 2013 (KR) ........................ 10-2013-0060970
Apr. 29, 2014 (KR) ........................ 10-2014-0051391

(51) Int. Cl.
*G06F 3/01* (2006.01)

(52) U.S. Cl.
CPC ................................... *G06F 3/017* (2013.01)

(58) Field of Classification Search
CPC ....................................................... G06F 3/01
See application file for complete search history.

(56) References Cited

U.S. PATENT DOCUMENTS

| 2002/0005108 | A1* | 1/2002 | Ludwig ............... G10H 1/00 84/600 |
| 2004/0189720 | A1* | 9/2004 | Wilson ............. G06K 9/00355 715/863 |
| 2008/0036732 | A1* | 2/2008 | Wilson .................. G06F 3/017 345/156 |
| 2008/0211779 | A1* | 9/2008 | Pryor ................ G01C 21/3664 345/173 |
| 2008/0252595 | A1* | 10/2008 | Boillot ................... G06F 3/011 345/156 |
| 2010/0054603 | A1* | 3/2010 | Klefenz ............... G06K 9/4633 382/187 |
| 2011/0102570 | A1* | 5/2011 | Wilf ...................... G06F 3/017 348/77 |
| 2012/0035934 | A1* | 2/2012 | Cunningham ....... G06F 1/1639 704/260 |
| 2012/0105315 | A1 | 5/2012 | Wilson et al. |

FOREIGN PATENT DOCUMENTS

| JP | 2012-108762 A | 6/2012 |
| KR | 10-2010-0109747 A | 10/2010 |
| KR | 10-1150008 B1 | 7/2012 |
| KR | 10-1234111 B1 | 2/2013 |

* cited by examiner

*Primary Examiner* — Shaheda Abdin
(74) *Attorney, Agent, or Firm* — Sughrue Mion, PLLC

(57) ABSTRACT

A user input processing apparatus using a motion of an object to determine whether to track the motion of the object, and track the motion of the object using an input image including information associated with the motion of the object.

29 Claims, 12 Drawing Sheets

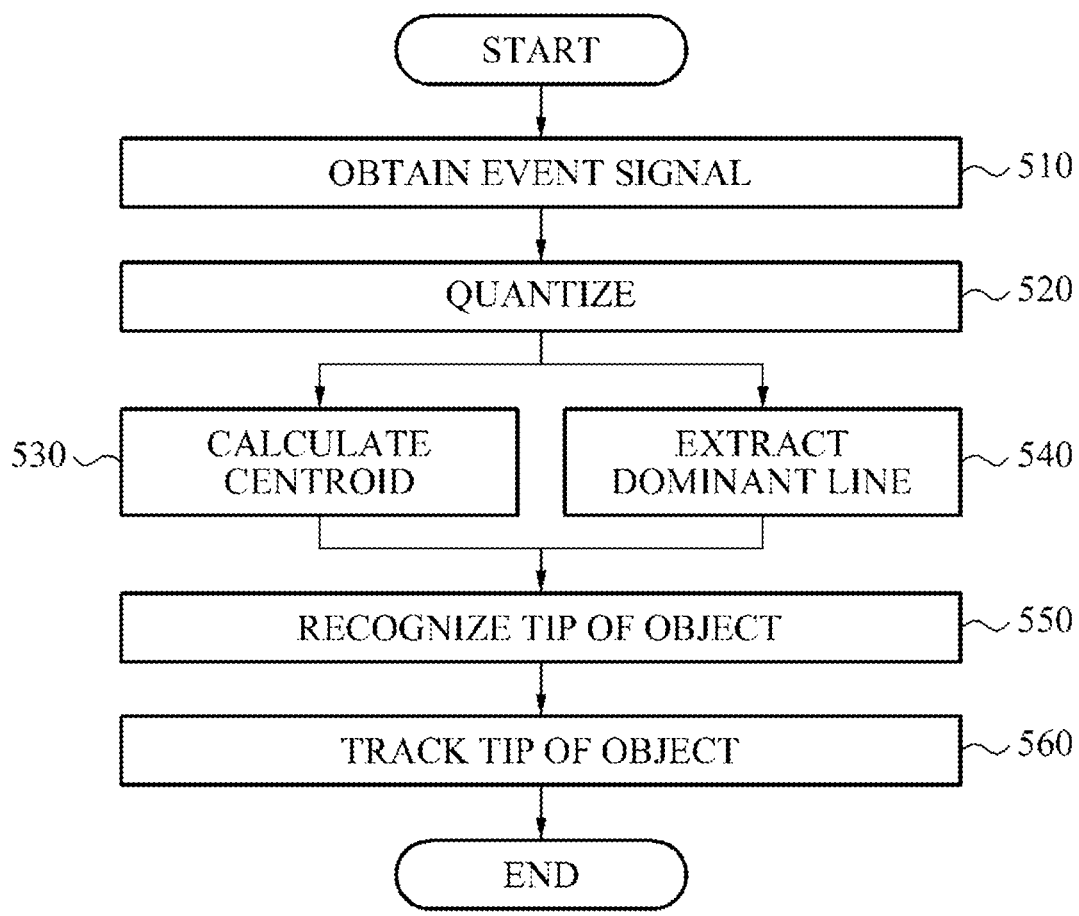

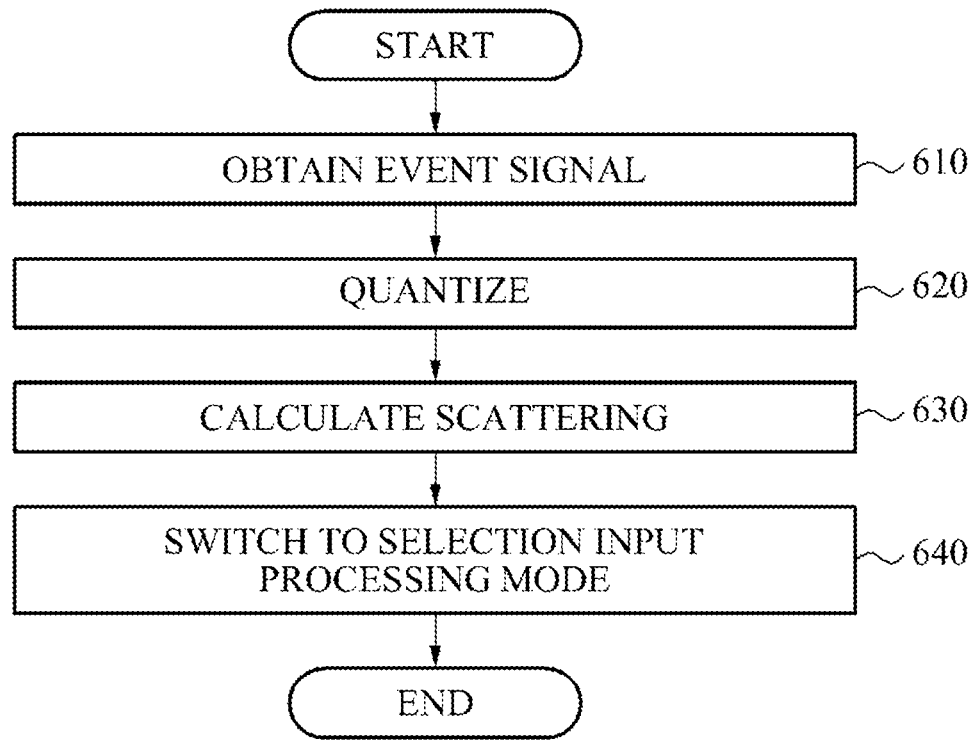

FIG. 7C
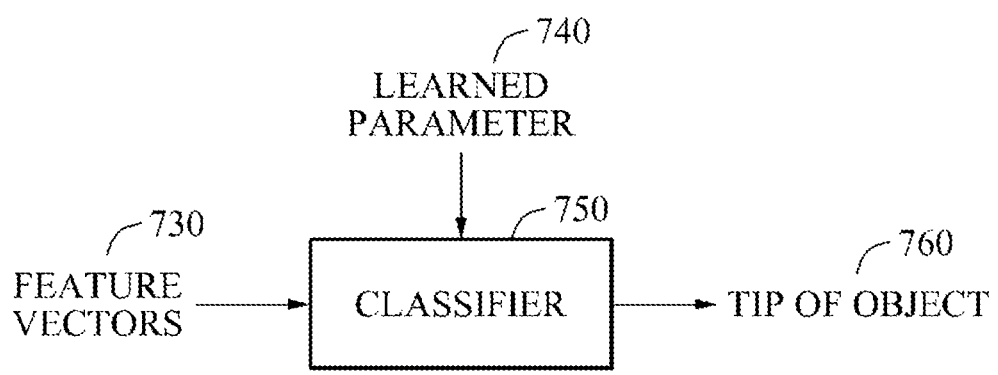
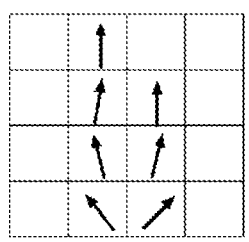
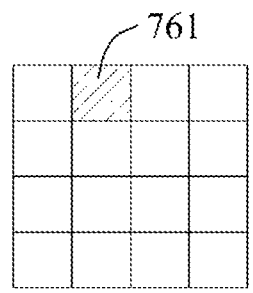

APPARATUS AND METHOD FOR PROCESSING USER INPUT USING MOTION OF OBJECT

CROSS-REFERENCE TO RELATED APPLICATION

This application claims priority from Korean Patent Application No. 10-2013-0060970, filed on May 29, 2013, and Korean Patent Application No. 10-2014-0051391, filed on Apr. 29, 2014, in the Korean Intellectual Property Office, the disclosures of which are incorporated herein by reference.

BACKGROUND

1. Field

Methods and apparatuses consistent with exemplary embodiments relate to an apparatus and method for processing a user input, and more particularly, to a technology for processing a user input using analysis of an input image.

2. Description of the Related Art

A conventional mouse input interface may move a location of a cursor by tracking a motion of a ball-mouse using a rolling ball or a laser-mouse using a scanning laser. Also, a mouse input interface may execute a predetermined function corresponding to a location of a cursor in response to a click of a mouse button.

With recent developments of an image processing technology, the conventional mouse input interface may be replaced by a user interface technology for recognizing an object in a three-dimensional (3D) space.

SUMMARY

According to an aspect of an exemplary embodiment, there may be provided an apparatus for processing a user input, the apparatus including a determiner configured to determine that at least one point corresponds to a first mode input instructing the apparatus to track motion of an object, based on an input image including the at least one point generated by sensing the motion of the object, and a processor configured to track the motion of the object, in response to the determiner determining that the at least one point corresponds to the first mode input.

In this instance, the determiner may be configured to determine that the at least one point corresponds to the first mode input by comparing a scattering of the at least one point to a threshold value and determine that the at least one point corresponds to the first mode input based on a result of the comparison.

The processor may include a centroid calculator configured to calculate a centroid of the at least one point, a line detector configured to detect a dominant line associated with the at least one point, and a detector configured to detect a portion of the object based on the centroid and the dominant line.

The determiner may be configured to determine that the at least one point corresponds to a second mode input by comparing the scattering of the at least one point to the threshold value and determine that the at least one point corresponds to the second mode input based on a result of the comparison.

The determiner may be configured to determine whether a pattern of the at least one point corresponds to a predetermined pose instructing suspension of the tracking.

According to another aspect of an exemplary embodiment, there may be provided a method of processing a user input, the method including obtaining an event signal of at least one image indicating movement of an object, calculating a centroid of a plurality of pixels included in the event signal, extracting a dominant line included of the plurality of pixels, and recognizing a portion of the object based on the centroid and the dominant line.

According to still another aspect of an exemplary embodiment, there may be provided a user input processing method including obtaining an event signal in which a motion of an object is sensed, dividing a plurality of pixels included in the event signal into a predetermined number of sections, calculating orientation vectors of the plurality of pixels, calculating feature vectors of the sections based on the orientation vectors, recognizing a portion of the object based on the feature vectors.

BRIEF DESCRIPTION OF THE DRAWINGS

Other aspects will become apparent and more readily appreciated from the following description of exemplary embodiments, taken in conjunction with the accompanying drawings of which:

FIG. 5 illustrates a method of processing a user input by tracking a motion of an object according to an exemplary embodiment; and FIG. 6 illustrates a method of processing a user input by recognizing a selection input according to an exemplary embodiment.

FIGS. 7A to 7D illustrate another example of a method of recognizing an object according to an exemplary embodiment.

DETAILED DESCRIPTION

Figure 1:
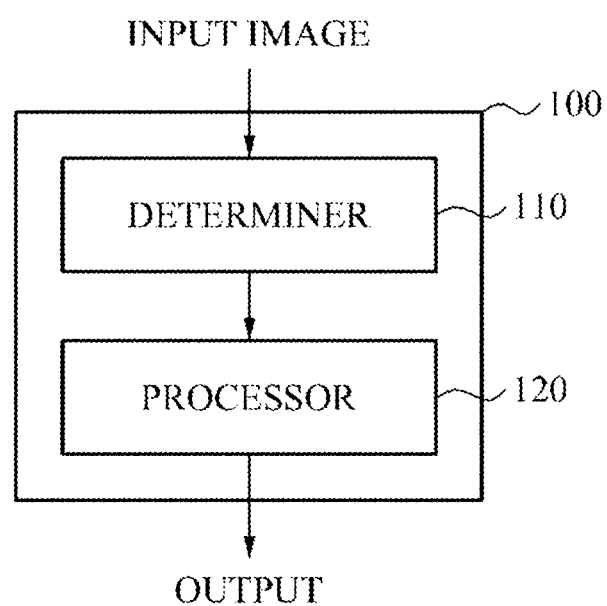
FIG. 1 illustrates an apparatus for processing a user input according to an exemplary embodiment.

Reference will now be made in detail to exemplary embodiments, examples of which are illustrated in the accompanying drawings, wherein like reference numerals refer to like elements throughout. The exemplary embodiments are described below to explain the present disclosure by referring to the figures.

FIG. 1 illustrates a user input processing apparatus 100 according to an exemplary embodiment.

Referring to FIG. 1, the user input processing apparatus 100 may recognize an input using recognition of and analysis of an object in a predetermined space in an image. The object may be an object detected and analyzed for performing an input to the user input processing apparatus 100. For example, the object may be a hand or a finger of a user, as discussed below.

The user input processing apparatus 100 may include a determiner 110 and a processor 120, and may be implemented in a portable device.

The determiner 110 may determine whether an input image corresponds to a first mode input, instructing to track motion of an object, based on the input image, which may provide at least one point at which the motion is sensed.

The input image may be an image output from a dynamic vision sensor used to photograph the object. The dynamic vision sensor may include a manual image sensor based on an operation principle of an optic nerve connected to a human retina. The dynamic vision sensor may refer to an image sensor based on an event and thus, may output a signal of the aforementioned event in response to the motion of the object. Hereinafter, for ease of description, the input image is referred to as an event signal, and the point is referred to as a pixel.

The event signal may include a signal that asynchronously occurs in response to the motion of the object. In a human body, the event signal may include information associated with an optic nerve signal transferred from a retina to a brain. For example, the event signal may occur only when a moving object is sensed, and may not occur with respect to a stationary object. In this instance, the event signal may include information associated with the moving object.

A plurality of pixels included in the event signal may correspond to portions of the object, of which motion of the object is sensed. For example, referring to FIG. 2A, when a hand of a user moves, the event signal may include a plurality of pixels corresponding to the hand.

Figure 2A:
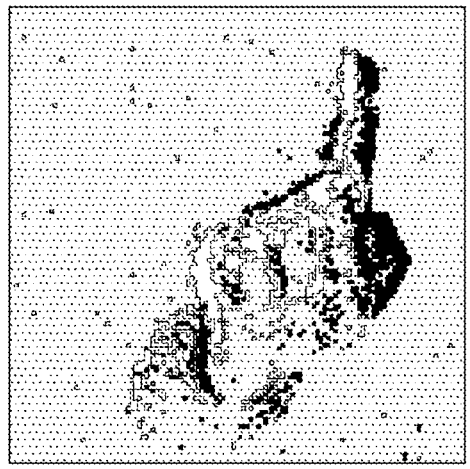
FIGS. 2A and 2B illustrate images describing operation modes determined based on a scattering of a plurality of pixels included in an input image according to an exemplary embodiment.
Figure 2B:
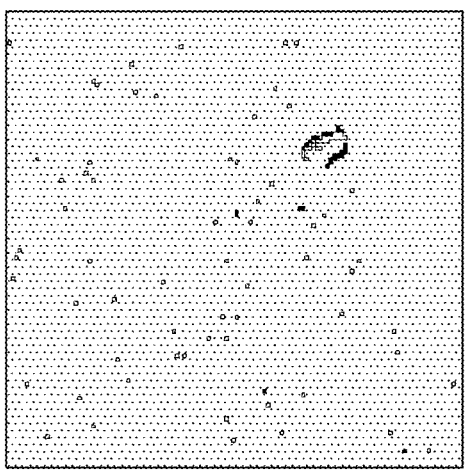

Alternatively, referring to FIG. 2B, when a user only moves an index finger, the event signal may only include pixels corresponding to the index finger.

The determiner 110 may determine an input corresponding to an operation mode based on a scattering of the plurality of pixels. The determiner 110 may calculate the scattering of the plurality of pixels included in the event signal. The determiner 110 may calculate the scattering of the plurality of pixels scattered in a predetermined direction. For example, the determiner 110 may calculate the scattering of the plurality of pixels scattered in a y-axial direction based on a centroid of the plurality of pixels.

The determiner 110 may determine an operation mode corresponding to the scattering of the plurality of pixels.

The determiner 110 may compare the scattering of the plurality of pixels included in the event signal to a threshold value, and determine that the event signal corresponds to a first mode input when the scattering is greater than or equal to the threshold value.

In addition, the determiner 110 may determine that the event signal corresponds to a second mode input when the scattering is less than the threshold value. Hereinafter, for ease of description, a motion in a first mode is referred to as a pointing gesture for user input and a motion in a second mode is referred to as a click gesture for user input.

Here, the threshold value may be predetermined as a value between a scattering value of a portion used for the pointing gesture and a scattering value of a portion used for the click gesture.

Referring to FIG. 2A, when an event signal occurs in response to a user moving an entire hand with an index finger being stretched, the determiner 110 may determine that the pointing gesture occurs, and determines an input corresponding to the pointing gesture.

Referring to FIG. 2B, when an event signal occurs in response to a user bending an index finger without moving a hand, the determiner 110 may determine that the click gesture occurs, and determines an input corresponding to the click gesture.

Accordingly, for example, the user input processing apparatus 100 may provide an air mouse function using a single image sensor. As used herein, the air mouse function refers to an interface provided by sensing motion of the object in a three-dimensional (3D) space for determining a corresponding input.

In general, to use the air mouse function, a process of generating a 3D image of an object and analyzing the generated 3D image is performed because information associated with a change in a depth of an object portion included in the image is used to determine whether a gesture, such as the click gesture, is input. For example, the object may be an index finger portion for performing the click gesture. In this example, at least two sets of image data are required to generate the 3D image.

The user input processing apparatus 100 may provide the air mouse function based on image data determined from a single image sensor, using an event signal in response to detection of the motion of the object.

The processor 120 may track the motion of the object and output a signal for the pointing gesture when an input image corresponds to a first mode input, for example, a pointing input. Alternatively, the processor 120 may output a signal for a click gesture when an image input corresponds to a second mode input, for example, a click input.

The pointing gesture refers to a motion including a comprehensive gesture for indicating a predetermined position on a display. For example, the pointing gesture may include a gesture for determining a position of a mouse cursor on a display and a gesture for moving a position of a mouse cursor on a display.

The click gesture refers to a motion including a comprehensive gesture for activating at least one function associated with a location to which a gesture is directed. For example, the click gesture may include left-clicking and double-clicking.

The processor 120 may output information associated with a position to which a tip of the object is pointed as a signal for the pointing gesture. Also, the processor 120 may output information used to indicate that the click gesture is recognized as a signal for the click gesture.

One skilled in the art may easily understand that a general mouse interface, such as dragging, drag-and-drop, right-clicking, and scrolling, for example, may be realized using various transformations and combinations of the pointing gesture and the click gesture.

FIGS. 2A and 2B illustrate diagrams describing operation modes determined based on a scattering of a plurality of pixels included in an input image according to an exemplary embodiment.

Referring to FIG. 2A, an event signal according to exemplary embodiments may include a plurality of pixels based on a motion of an entire hand.

For example, when a user moves a hand in a predetermined direction with an index finger being extended, the event signal may include a plurality of pixels corresponding to the entire hand in which the extending motion occurs.

The event signal may include an ON event or an OFF event based on a type of a sensed event. For example, black pixels may include pixels in which the OFF event is sensed. In this example, the OFF event refers to an event in which a brightness of an input light is adjusted to be darker by at least a threshold value corresponding to the OFF event. As another example, white pixels may include pixels in which the ON event is sensed. Here, the ON event refers to an event in which a brightness of an input light is adjusted to be brighter by at least a threshold value corresponding to the ON event.

A user input processing apparatus according to exemplary embodiments may detect a portion of an object, such as a tip of a finger, for a pointing gesture based on a plurality of pixels.

Depending on cases, the user input processing apparatus may detect the tip of the object based on the type of the sensed event. For example, the user input processing apparatus may detect the tip of the object in response to both ON event and OFF event signals. Also, the user input processing apparatus may detect the tip of the object in response to one of the ON event signal and the OFF event signal.

Further descriptions about an operation of detecting a tip of an object for a pointing gesture will be provided with reference to FIGS. 3A through 3D and FIGS. 7A through 7D.

Referring to FIG. 2B, an event signal according to an exemplary embodiment may include a plurality of pixels, for example, based on a motion of a finger.

For example, when a user bends a first knuckle of an index finger, similar to the user actually clicking a mouse, the event signal may include a plurality of pixels corresponding to the single knuckle of the index finger in which the clicking motion occurs.

The user input processing apparatus may determine that a motion input by the user corresponds to a click gesture based on a scattering of pixels included in the event signal.

The user input processing apparatus may calculate the scattering based on a type of a sensed event. For example, the user input processing apparatus may detect the scattering in response to both ON event and OFF event signals. Also, the user input processing apparatus may detect the scattering in response to one of the ON event signal and the OFF event signal.

FIGS. 3A to 3D illustrate an example of a method of recognizing a portion of an object according to an exemplary embodiment.

Figure 3A:
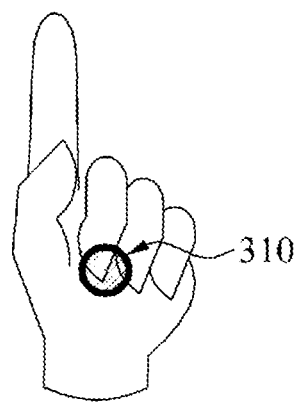
FIGS. 3A to 3D illustrate an example of a method of recognizing an object according to an exemplary embodiment.

Referring to FIG. 3A, a user input processing apparatus according to an exemplary embodiment may calculate a centroid 310 of a plurality of pixels included in an event signal.

For example, although not illustrated, the processor 120 of FIG. 1 may include a centroid calculator. The centroid calculator may calculate an x-coordinate of the centroid 310 by calculating a sum of all x-coordinate values of the plurality of pixels included in the event signal and dividing the sum of all x-coordinate values by a number of pixels. Also, the centroid calculator may calculate a y-coordinate of the centroid 310 by calculating a sum of all y-coordinate values of the plurality of pixels included in the event signal and dividing the sum of all y-coordinate values by a number of pixels.

Figure 3B:
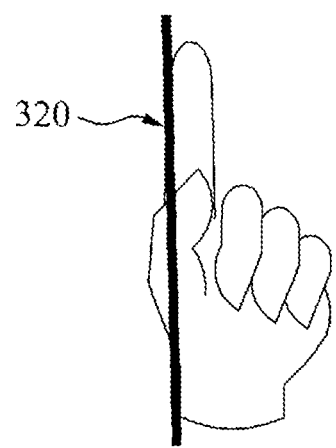

Referring to FIG. 3B, the user input processing apparatus may extract a dominant line 320 based on the plurality of pixels included in the event signal.

For example, although not illustrated, the processor 120 of FIG. 1 may include a line detector. In this example, the dominant line 320 is the most dominant line among a plurality of lines that may be configured using the plurality of pixels included in the event signal. For example, when an object is a hand with an extended index finger, the dominant line 320 may be a line corresponding to a direction indicated by the extended index finger.

To extract a dominant line, the line detector may express, in the form of angular coordinates, the plurality of lines that may be configured using the plurality of pixels included in the event signal. The line detector may obtain the plurality of lines by performing a Hough transformation on the plurality of pixels included in the event signal, and obtain the dominant line from among the obtained plurality of lines.

Figure 3C:
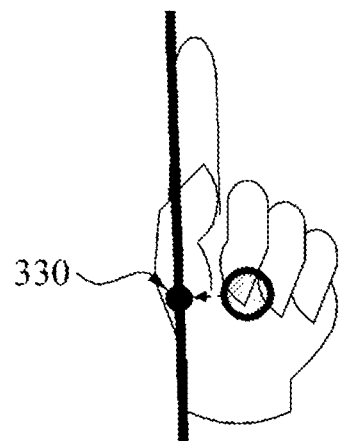

Referring to FIG. 3C, to recognize a portion of an object, which may be a tip of a finger, the user input processing apparatus may project a point corresponding to a centroid onto a dominant line.

For example, the user input processing apparatus may project the centroid 310 of FIG. 3A onto the dominant line 320 of FIG. 3B and thus, may obtain a projective point 330.

Figure 3D:
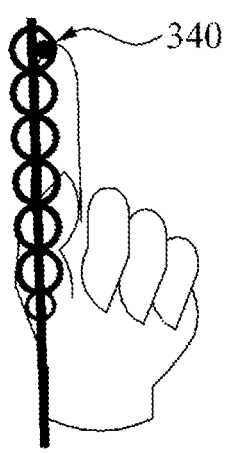

Referring to FIG. 3D, to recognize a tip of an object, the user input processing apparatus may survey a dominant line from a projective point to the tip of the object positioned in a predetermined direction.

For example, the user input processing apparatus may survey the dominant line 320 of FIG. 3B from the projective point 330 of FIG. 3C to the tip of the object positioned in a direction in which a y-coordinate value increases. The user input processing apparatus may recognize an end area 340 in which the plurality of pixels included in the event signal exists, among a plurality of areas existing on the dominant line 320, as the tip of the object.

According to other exemplary embodiments, although not illustrated, the user input processing apparatus may determine that a user input corresponds to a click gesture based on a number of areas surveyed until a tip of an object is recognized.

For example, the user input processing apparatus may estimate a scattering of a plurality of pixels included in an event signal based on a number of areas surveyed until a tip of an object is recognized. When the number of areas surveyed is less than a predetermined threshold value, the user input processing apparatus may determine that the click gesture is input.

FIGS. 4A to 4D illustrate diagrams describing a method of recognizing a predetermined pose according to an exemplary embodiment.

Although not illustrated, the determiner 110 of FIG. 1 may verify whether a pattern configured in an event signal using the at least one point corresponds to a predetermined pose for determining a corresponding input.

The determiner 110 may determine that the event signal corresponds to a third mode input instructing suspension of the tracking when the pattern corresponds to the predetermined pose.

The pose corresponding to the suspension of the tracking may be predetermined, and the determiner 110 may determine whether the predetermined pose is performed. Hereinafter, for ease of description, the predetermined pose is assumed to be a pose of spreading out five fingers.

Figure 4A:
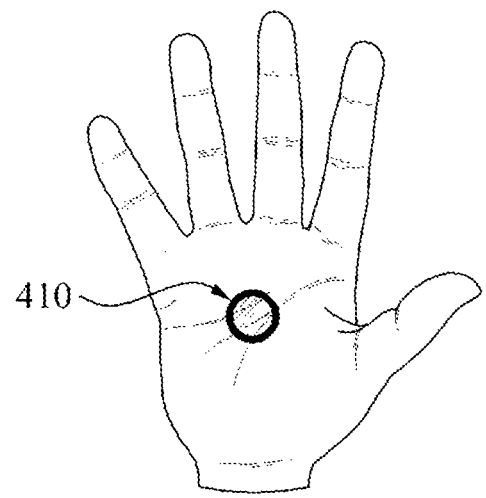
FIGS. 4A to 4D illustrate diagrams describing a method of recognizing a predetermined pose according to an exemplary embodiment.

Referring to FIG. 4A, the determiner 110 may calculate a centroid 410 of a plurality of pixels included in an event signal. The description made above with reference to FIG. 3A may be applied to a method of calculating the centroid 410 and thus, a repeated description will be omitted herein for conciseness.

Figure 4B:
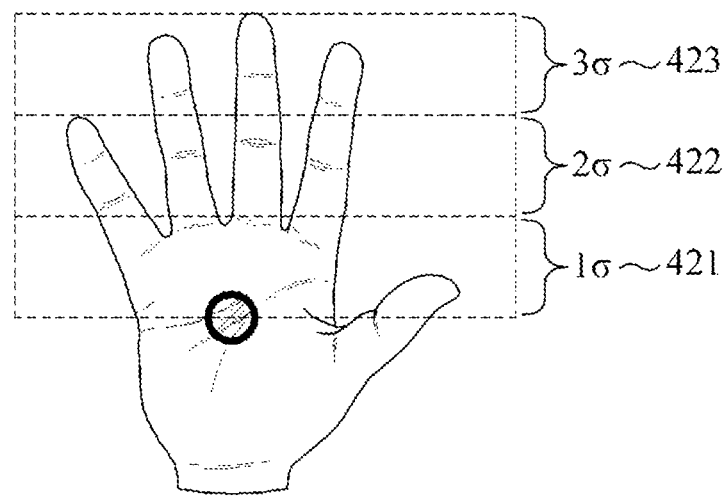

Referring to FIG. 4B, the determiner 110 may divide the plurality of pixels included in the event signal into a plurality of areas based on a distance from the centroid 410, in a predetermined direction.

For example, the determiner 110 may divide the plurality of pixels included in the event signal into a first area 421 located closest to the centroid 410, a second area 422 located in an intermediate range of the centroid 410, and a third area 423 located farthest from the centroid 410, with respect to a direction in which a y-axial coordinate value increases.

Figure 4C:
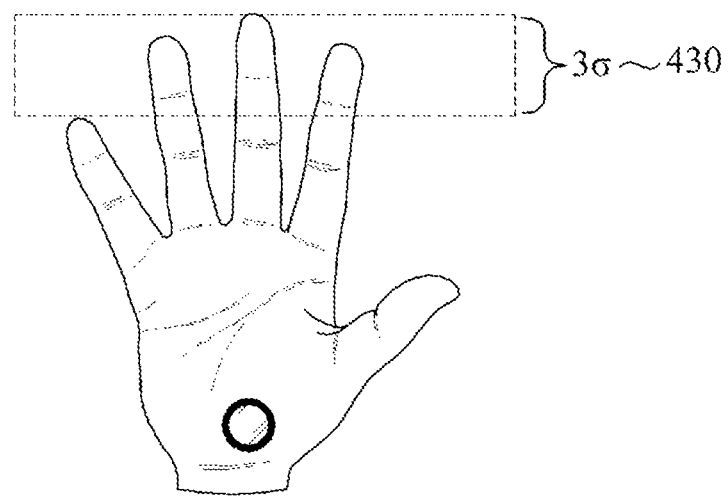

Referring to FIG. 4C, the determiner 110 may estimate a pattern of pixels included in an area separated from the centroid 410 by at least a predetermined distance in a predetermined direction. The pattern of pixels may include a pattern in which a plurality of pixels is scattered.

For example, the determiner 110 may measure a third area 430 separated from the centroid 410 by a predetermined distance, with respect to a direction in which a y-axial coordinate value increases. In FIG. 4B, the determiner 110 may select the third area 423 located farthest from the centroid 410 from among the first area 421, the second area 422, and the third area 423.

To determine whether the pose of the object corresponds to suspension of a spatial input recognizing operation, the determiner 110 may estimate a pattern of pixels included in the third area 430.

Figure 4D:

For example, the determiner 110 may obtain a curve 442 illustrated in FIG. 4D by calculating a sum of a number of pixels having a same x-axial coordinate value among a plurality of pixels, along an x axis of the third area 430.

Referring to FIG. 4D, the x axis of the curve 442 of FIG. 4D may correspond to the x axis of the third area 430 of FIG. 4C. A y-axis of the curve 442 of FIG. 4D may represent a number of pixels having an x coordinate corresponding to an x-axial value for each of a plurality of pixels included in the third area 430.

The determiner 110 may compare a predetermined suspension pose threshold value 441 to the curve 442 and thus, may determine whether the pose of the object corresponds to the suspension of a spatial input recognizing operation.

For example, the curve 442 may have a repetitive pattern in which a y-coordinate value increases or decreases with respect to the suspension pose threshold value 441, depending on an increase in an x-coordinate value. The determiner 110 may count a number of the repetitive patterns. The determiner 110 may determine that the pose of the object corresponds to the pose of spreading out five fingers when the counted number of patterns is greater than or equal to a predetermined threshold.

Alternatively, the determiner 110 may count a number of peaks greater than the suspension pose threshold value 441 among a plurality of peaks included in the curve 442. The determiner 110 may determine that the pose of the object corresponds to the pose of spreading out five fingers when the counted number of peaks is greater than or equal to a predetermined threshold.

According to other exemplary embodiments, although not illustrated, the determiner 110 may apply a line filter method to a plurality of pixels included in an event signal and thus, may determine whether a pose of an object corresponds to suspension of a spatial input recognizing operation.

The determiner 110 may apply a variety of line filter methods. For example, the determiner 110 may use an orientation filter, a Hough filter, a Gabor filter, or a template matching filter.

In particular, the determiner 110 may apply the line filter method to a plurality of pixels included in an event signal and thus, may extract vertical components excluding horizontal components from the plurality of pixels.

The determiner 110 may measure a pattern of pixels using the extracted vertical components. For example, the determiner 110 may measure the pattern of pixels included in the extracted vertical components by calculating a sum of a number of pixels having a same x-coordinate value among pixels included in the extracted vertical components, along an x-axis of an area including the extracted vertical components.

In this example, the determiner 110 may obtain a sharp curve when compared to the curve 442 of FIG. 4D. Thus, the determiner 110 may further accurately recognize the pose input by the object.

FIG. 5 illustrates a method of processing a user input tracking a motion of an object according to an exemplary embodiment.

Referring to FIG. 5, in the method of processing a user input according to exemplary embodiments, an object may be recognized in a predetermined space and the recognized object may be used to determine an input.

In operation 510, an event signal in which a motion of an object is sensed may be obtained. In operation 530, a centroid of a plurality of pixels included in the event signal may be calculated. In operation 540, a dominant line included in the plurality of pixels may be extracted.

In operation 550, a portion of an object, such as a tip of a finger, may be recognized based on the centroid and the dominant line.

The description provided with reference to FIGS. 1 through 4D may be applied to each of operations 510, 530, 540, and 550 of FIG. 5 and thus, repeated detailed descriptions will be omitted herein for conciseness.

According to other exemplary embodiments, in operation 520, a quantization method may be applied to reduce an error resulting from noise included in the event signal.

In the method of processing a user input, for example, the plurality of pixels included in the event signal may be classified into a plurality of blocks. The plurality of blocks included in the event signal may be classified into N×M-dimensional matrix blocks based on locations of the plurality of pixels. Here, N and M denote positive integers and may be predetermined.

In the method of processing a user input, blocks including at least a predetermined number of pixels may be selected from among the plurality of blocks. Blocks including a number of pixels less than the predetermined number may be determined to be blocks including noise, rather than significant information.

In the method for processing a user input, pixels included in the selected blocks may be obtained, and the obtained pixels may be used to perform operation 530 and subsequent operations.

According to other exemplary embodiments, in operation 560, the tip of the object may be tracked. The tip of the object recognized in operations 510 through 550 may be stored in a memory. A trajectory of the tip of the object, in which a location of the tip of the object newly recognized in response to a subsequent signal is changed from the location of the tip of the object previously stored, may be tracked.

According to other exemplary embodiments, although not illustrated, a filtering method may be applied between operation 550 and operation 560 to smooth a pattern of moving the tip of the object. For example, a Kalman filter may be used in the method of processing a user input.

FIG. 6 illustrates a method of processing a user input recognizing a selection input according to an exemplary embodiment.

Referring to FIG. 6, in operation 610, an event signal may be obtained based on a motion of an object. In operation 630, a scattering of a plurality of pixels included in the event signal may be calculated. In operation 640, an operation mode may be switched to a selection input processing mode based on the scattering of the plurality of pixels. A signal for a click gesture may be generated in the selection input processing mode.

According to other exemplary embodiments, in operation 620, a quantization method may be applied to reduce error resulting from noise included in the event signal.

The description provided with reference to FIGS. 1 through 5 may be applied to operations illustrated in FIG. 6 and thus, repeated detailed descriptions will be omitted herein for conciseness.

FIGS. 7A to 7D illustrate another example of a method of recognizing an object according to an exemplary embodiment.

Figure 7A:
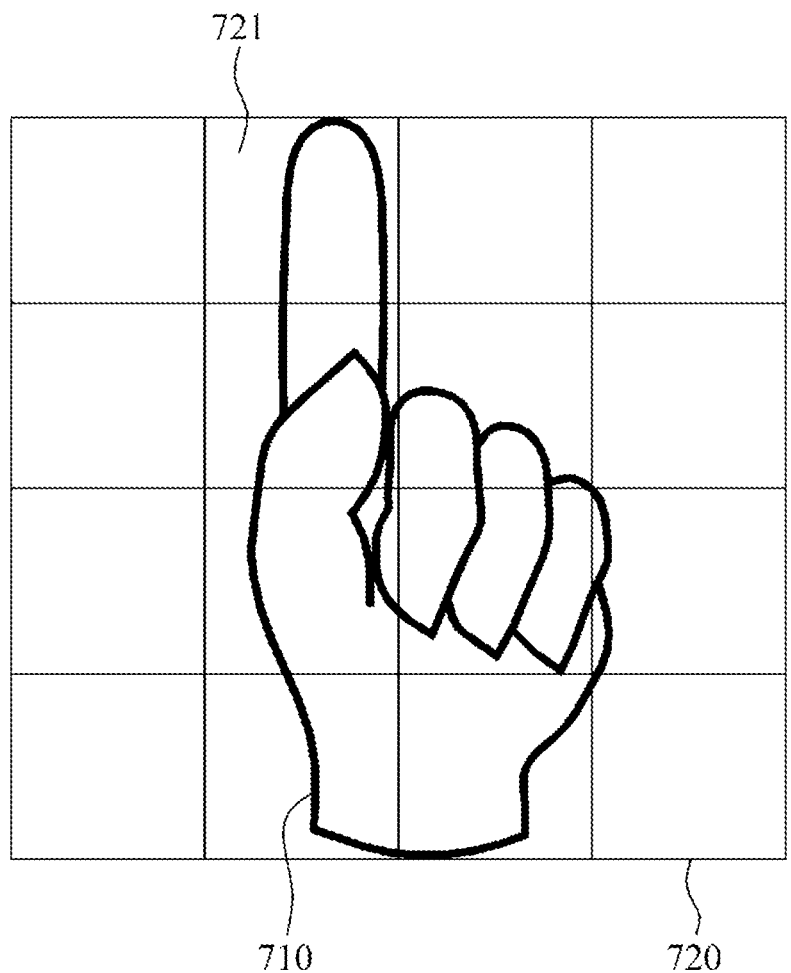

Referring to FIG. 7A, a user input processing apparatus according to an exemplary embodiment may divide a plurality of pixels 710 included in an event signal into a predetermined number of sections 720. For example, the predetermined number of sections 720 may be provided in a 4×4 matrix form.

Figure 7B:
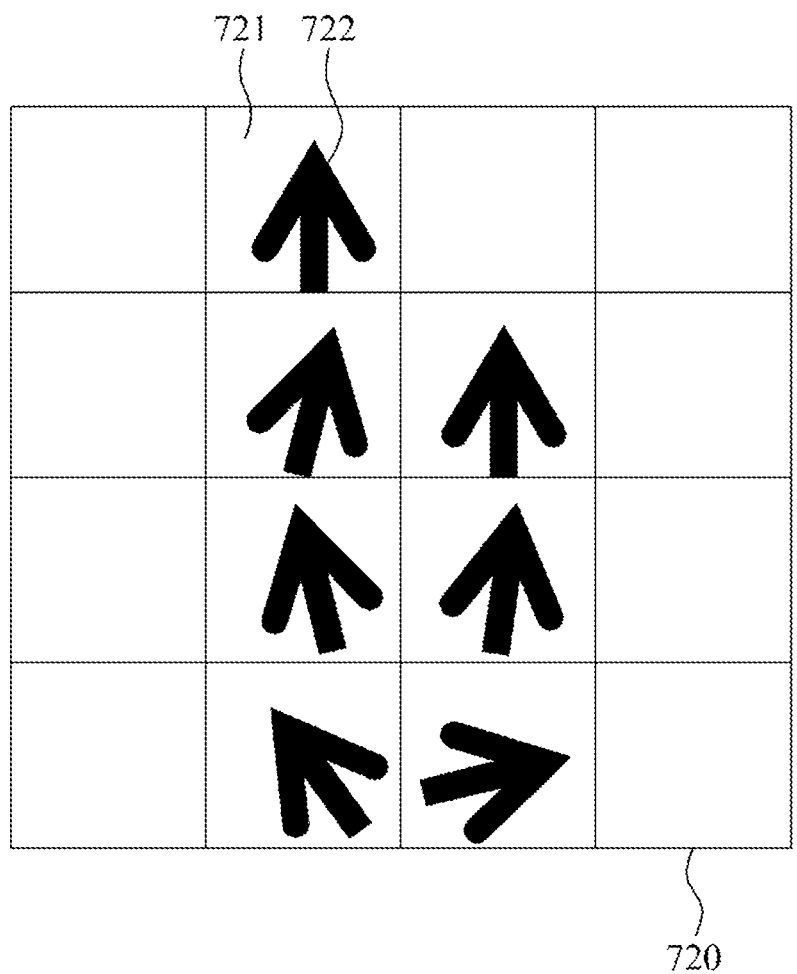

Referring to FIG. 7B, the user input processing apparatus may calculate feature vectors of the predetermined number of sections 720. A feature vector of one of the predetermined number of sections 720 may be calculated based on orientation vectors of pixels included in a corresponding section.

An orientation vector of a single pixel may be calculated based on neighboring pixels of a corresponding pixel. To calculate the orientation vector, x-axial variation and y-axial variation may be calculated. For example, in a case of using eight neighboring pixels of a single pixel, the x-axial variation may be increased when an event is sensed at each of a right pixel, an upper right pixel, and a lower right pixel. When an event is sensed at each of a left pixel, an upper left pixel, and a lower left pixel, the x-axial variation may be reduced. When an event is sensed at each of an upper pixel, an upper left pixel, and an upper right pixel, the y-axial variation may be increased. When an event is sensed at each of a lower pixel, a lower left pixel, and a lower right pixel, the y-axial variation may be reduced.

A magnitude of the orientation vector may be calculated by an equation, for example, $\{(\text{x-axial variation})^2+(\text{y-axial variation})^2\}^{0.5}$. A direction of the orientation vector may be calculated by an equation, for example, $\arctan\{(\text{y-axial variation})/(\text{x-axial variation})\}$.

As an example, to calculate a feature vector 722 of a section 721, the user input processing apparatus may perform a vector summing on orientation vectors of pixels included in the section 721 of FIG. 7A. In this example, the feature vector 722 of the section 721 may be a result of the vector summing performed on the orientation vectors of the pixels included in the section 721 of FIG. 7A.

As another example, to calculate the feature vector 722 of the section 721, the user input processing apparatus may extract the most dominant vector from among the orientation vectors of the pixels included in the section 721 of FIG. 7A. The most dominant vector may be an orientation vector occupying the largest proportion among a plurality of orientation vectors included in a corresponding section. For example, the most dominant vector may be an orientation vector of which a number is the greatest among the plurality of orientation vectors included in the corresponding section. In this example, the feature vector 722 of the section 721 may be the most dominant vector extracted from the orientation vectors of the pixels include in the section 721 of FIG. 7A.

The user input processing apparatus may quantize directions of the orientation vectors to be one of a predetermined number of quantization directions. For example, the input processing apparatus may divide 0 degrees (°) through 180° into four equal parts to quantize the directions of the orientation vectors to be one of 0°, 45°, 90°, and 135°.

The user input processing apparatus may calculate feature vectors of sections based on the quantized directions of the orientation vectors. For example, to calculate the feature vector 722 of the section 721, the user input processing apparatus may count a number of pixels corresponding to each of the quantization directions of the pixels included in the section 721 of FIG. 7A. As a result of the counting, one pixel may be quantized by 0°, four pixels may be quantized by 45°, five pixels may be quantized by 135°, and thirty pixels may be quantized by 90°.

In this example, the user input processing apparatus may generate a feature vector having a magnitude of an orientation vector corresponding to each of the quantization directions. For example, a magnitude of an orientation vector corresponding to a quantization direction may be calculated based on a number of pixels counted correspondingly to the quantization direction. In this case, the feature vector 722 of the section 721 may be calculated to be (1, 4, 5, 30). Here, (1, 4, 5, 30) may be a vector sequentially including a number of pixels quantized by 0°, 45°, 90°, and 135°. As another example, the magnitude of the orientation vector corresponding to the single quantization direction may be calculated by dividing the number of pixels counted correspondingly to the quantization direction by a total number of pixels included in a section. In this example, the feature vector 722 may be calculated to be (1/40, 4/40, 5/40, 30/40). Here, (1/40, 4/40, 5/40, 30/40) may be a vector sequentially including results obtained by dividing the number of pixels quantized by 0°, 45°, 90°, and 135°, by the total number of pixels included in the section.

The user input processing apparatus may select the most dominant orientation vector based on a result of the counting. The user input processing apparatus may select an orientation vector corresponding to a quantization direction of which a number of pixels is the greatest among the quantization directions. In this case, the feature vector 722 may be an orientation vector corresponding to 90°.

Referring to FIG. 7C, the user input processing apparatus may recognize a tip 760 of an object based on feature vectors 730. The user input processing apparatus may obtain a section 761 corresponding to the tip 760 of the object from among a predetermined number of sections by inputting a learned parameter 740 and the feature vectors 730 to a classifier 750.

A classification algorithm used by the classifier 750 may include at least one of a support vector machine (SVM), a k-nearest neighbor algorithm, an adaptive resonance theory, a deep neural network, and a multilayer perceptron.

Figure 7D:
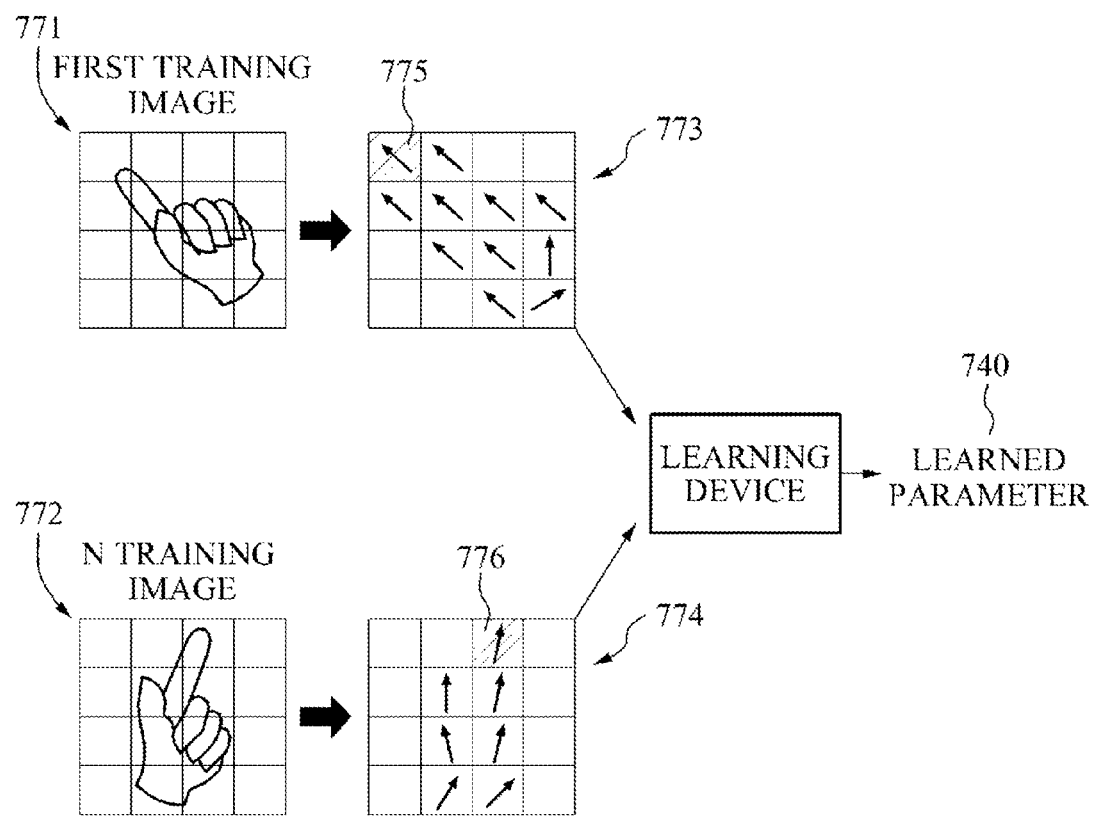

Referring to FIG. 7D, the learned parameter 740 according to an exemplary embodiment may be previously learned based on feature vectors 773 and 774 of a plurality of training images 771 and 772, and sections 775 and 776 corresponding to a tip of an object of the plurality of training images 771 and 772.

As an example, the user input processing apparatus according to an exemplary embodiment may recognize a hand image to detect a fingertip. To recognize the hand image, the user input processing apparatus may divide an output screen of an event-based image sensor into a plurality of sections. The user input processing apparatus may calculate orientation vectors of pixels included in each of the sections. The user input processing apparatus may allow the calculated sections and sections corresponding to the fingertip to be learned based on the classification algorithm.

In a process of learning, a training image including an event corresponding to a hand of a user and an event corresponding to a background may be used. By using the learned parameter 740, the user input processing apparatus may robustly detect the fingertip despite an occurrence of noise, for example, a movement of the background. For example, when an event-based image sensor included in a mobile device is used, both the hand of the user and the background may be recognized as being moved due to a movement of the mobile device. By using the learned parameter 740, the user input processing apparatus may detect the fingertip of the user from an event signal obtained by the mobile device.

The exemplary embodiments may be implemented in a portable device, as used throughout the present specification, which includes mobile communication devices, such as a personal digital cellular (PDC) phone, a personal communication service (PCS) phone, a personal handyphone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (e.g. car navigation system), and the like. Also, the portable device as used throughout the present specification includes a digital camera, a plasma display panel, and the like.

The functions in the above-described exemplary embodiments may be recorded in non-transitory computer-readable media including program instructions to implement the various functions by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described exemplary embodiments may be implemented as hardware devices, and may be configured to act as one or more software modules in order to perform the functions of the above-described embodiments, or vice versa.

Although exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An apparatus for processing a user input, the apparatus comprising:
    a sensor configured to output event signals in response to sensing a movement of an object, wherein the event signals comprise information indicating pixels sensing an event corresponding to a part, which the movement is sensed, of the object, among sensing pixels of the sensor, wherein each of the pixels senses the event based on a change of input light due to the movement; and
    a processor configured to determine whether the event signals correspond to a first mode input for a tracking operation, by comparing a scattering of the plurality of pixels to a threshold value, and to track the movement in response to the determination that the event signals correspond to the first mode input,
    wherein the threshold value is greater than a first scattering of pixels corresponding to at least a part of a finger, and the threshold value is smaller than a second scattering of pixels corresponding to a hand.

2. The apparatus of claim 1, wherein the processor is further configured to determine that the event signals correspond to the first mode input, when the scattering of the plurality of pixels is greater than the threshold value.

3. The apparatus of claim 2, wherein the processor is further configured to determine that the event signals correspond to a second mode input for a selecting operation, when the scattering of the plurality of pixels is smaller than the threshold value.

4. The apparatus of claim 1, wherein the processor is further configured to calculate the scattering of the plurality of pixels in a predetermined direction.

5. The apparatus of claim 1, wherein the processor is further configured to:
    calculate a centroid of the plurality of pixels, detect a dominant line associated with the plurality of pixels, and detect a portion of the object based on the centroid and the dominant line.

6. The apparatus of claim 5, wherein the processor is further configured to:
    obtain a plurality of lines by performing a Hough transformation on the plurality of pixels, and obtain the dominant line based on the plurality of lines.

7. The apparatus of claim 5, wherein the processor is further configured to:
    project the centroid onto the dominant line, and explore the dominant line from the projected location toward the portion of the object positioned in a predetermined direction.

8. The apparatus of claim 1, wherein the processor is further configured to:
    calculate an orientation vector of the plurality of pixels, divide the plurality of pixels into a predetermined number of sections, calculate feature vectors of the sections based on the orientation vector, and recognize a portion of the object based on the feature vectors.

9. The apparatus of claim 8, wherein a direction of the orientation vector is quantized to be one of a predetermined number of quantization directions.

10. The apparatus of claim 8, wherein the processor is further configured to:
    obtain a section corresponding to the portion of the object from among the predetermined number of sections by inputting a previously learned parameter and the feature vectors to a classifier.

11. The apparatus of claim 1, wherein the processor is further configured to determine a pattern of the plurality of pixels corresponds to a predetermined pose instructing suspension of the tracking.

12. The apparatus of claim 11, wherein the processor is further configured to:
    calculate a centroid of the plurality of pixels; detect, among the plurality of pixels, an area pattern of a point included in an area, separate from the centroid by at least a predetermined distance, in a predetermined direction; and determine whether the area pattern corresponds to the predetermined pose.

13. The apparatus of claim 11, wherein the processor is further configured to:
extract a component of a predetermined direction by applying a line filter method to the plurality of pixels,
detect a component pattern of the plurality of pixels based on the component of the predetermined direction, and
determine whether the component pattern corresponds to the predetermined pose.

14. The apparatus of claim 1, wherein the at least the part of the finger corresponds to an index finger.

15. A method of processing a user input, the method comprising:
obtaining event signals output by a sensor in response to sensing a movement of an object, wherein the event signals comprise information indicating pixels sensing an event corresponding to a part, which the movement is sensed, of the object, among sensing pixels of the sensor, wherein each of the pixels senses the event based on a change of input light due to the movement;
determining whether the event signals correspond to a selection input processing mode for a selecting operation, by comparing a scattering of the plurality of pixels to a threshold value, wherein the threshold value is greater than a first scattering of pixels corresponding to at least a part of a finger, and the threshold value is smaller than a second scattering of pixels corresponding to a hand;
calculating a centroid of the plurality of pixels;
extracting a dominant line included of the plurality of pixels; and
recognizing a portion of the object based on the centroid and the dominant line.

16. The method of claim 15, wherein the obtaining comprises:
classifying the plurality of pixels into a plurality of blocks;
selecting blocks including at least a predetermined number of pixels from among the plurality of blocks; and
obtaining pixels included in the selected blocks.

17. The method of claim 15, further comprising:
calculating the scattering of the plurality of pixels;
comparing the scattering to the threshold value; and
switching an operation mode to the selection input processing mode based on a result of the comparing.

18. The method of claim 15, further comprising:
determining whether a pattern of the plurality of pixels corresponds to a predetermined pose indicating suspension of a tracking mode; and
switching an operation mode to a suspension mode based on a result of the determining.

19. A non-transitory computer-readable medium comprising a program which, when executed, causes a computer to perform the method of claim 15.

20. A user input processing method comprising:
obtaining event signals output by a sensor in response to sensing a movement of an object, wherein the event signals comprise information indicating pixels sensing an event corresponding to a part, which the movement is sensed, of the object, among sensing pixels of the sensor, wherein each of the pixels senses the event based on a change of input light due to the movement;
determining whether the event signals correspond to a selection input processing mode for a selecting operation, by comparing a scattering of the plurality of pixels to a threshold value, wherein the threshold value is greater than a first scattering of pixels corresponding to at least a part of a finger, and the threshold value is smaller than a second scattering of pixels corresponding to a hand;
dividing the plurality of pixels into a predetermined number of sections;
calculating orientation vectors of the plurality of pixels;
calculating feature vectors of the sections based on the orientation vectors; and
recognizing a portion of the object based on the feature vectors.

21. The method of claim 20, wherein the calculating of the orientation vectors comprises quantizing directions of the orientation vectors to be one of a predetermined number of quantization directions.

22. The method of claim 20, wherein the calculating of the feature vectors comprises calculating a vector sum of the orientation vectors of the pixels included in each of the sections, and generating a feature vector of each of the sections based on the vector sum.

23. The method of claim 20, wherein when the directions of the orientation vectors are quantized to be one of the predetermined number of quantization directions, the calculating of the feature vectors comprises:
counting a number of pixels corresponding to the quantization directions among the pixels included in each of the sections; and
generating a feature vector of each of the sections based on the number of pixels counted.

24. The method of claim 20, wherein the feature vector for each of the sections comprises elements corresponding to the quantization directions, and each of the elements is generated based on the number of pixels counted correspondingly to each of the quantization directions.

25. The method of claim 20, wherein the feature vector of each of the sections is generated based on an orientation vector corresponding to a quantization direction of which a number of pixels is the greatest among the quantization directions.

26. The method of claim 20, wherein the calculating of the feature vectors comprises:
extracting the most dominant vector from among the orientation vectors of the pixels in each of the sections; and
generating a feature vector for each of the sections based on the most dominant vector.

27. The method of claim 20, wherein the recognizing comprises acquiring a section corresponding to the portion of the object among the predetermined number of sections by inputting a learned parameter and the feature vectors to a classifier.

28. The method of claim 20, wherein the learned parameter is previously learned based on feature vectors of a plurality of training images and sections corresponding to the portion of the object in the plurality of training images.

29. A non-transitory computer-readable medium comprising a program which, when executed, causes a computer to perform the method of claim 20.

* * * * *